(12) United States Patent
Finlayson

(10) Patent No.: US 7,894,117 B2
(45) Date of Patent: Feb. 22, 2011

(54) TRANSPARENT WINDOW SWITCHABLE REAR VISION MIRROR

(76) Inventor: Andrew Finlayson, 102 Westcotts Road, Wallace, Victoria 3352 (AU)

( * ) Notice: Subject to any disclaimer, the term of this patent is extended or adjusted under 35 U.S.C. 154(b) by 0 days.

(21) Appl. No.: 12/160,726

(22) PCT Filed: Jan. 15, 2007

(86) PCT No.: PCT/AU2007/000023

§ 371 (c)(1),
(2), (4) Date: Sep. 10, 2008

(87) PCT Pub. No.: WO2007/079539

PCT Pub. Date: Jul. 19, 2007

(65) Prior Publication Data

US 2009/0046346 A1 Feb. 19, 2009

(30) Foreign Application Priority Data

Jan. 13, 2006 (AU) .............................. 2006900152

(51) Int. Cl.
*G02F 1/153* (2006.01)
*G02B 26/00* (2006.01)

(52) U.S. Cl. ...................... 359/267; 359/272; 359/296; 359/843; 359/844; 349/113; 349/193; 362/494; 362/516; 362/518

(58) Field of Classification Search ................. 359/265, 359/267, 272, 296, 843, 844; 349/113, 193; 362/494, 516, 518
See application file for complete search history.

(56) References Cited

U.S. PATENT DOCUMENTS

| 5,905,590 | A | 5/1999 | Van Der Sluis et al. |
|---|---|---|---|
| 6,301,039 | B1 * | 10/2001 | Tench .......................... 359/267 |
| 6,310,725 | B1 | 10/2001 | Duine et al. |
| 6,654,154 | B2 | 11/2003 | Johnson et al. |
| 6,680,790 | B2 | 1/2004 | Johnson et al. |

(Continued)

FOREIGN PATENT DOCUMENTS

WO 2005/069069 7/2005

(Continued)

*Primary Examiner*—Evelyn A. Lester
(74) *Attorney, Agent, or Firm*—Nexsen Pruet, LLC; Joseph T. Guy

(57) ABSTRACT

A transparent window switchable rear vision mirror adapted to be secured to a motor vehicle for improved road safety, said switchable window/mirror including, a film suitable for use as a light modulating unit of suspended particle device (spd) light valve, said film comprising a matrix polymer material having droplets of a liquid light valve suspension comprising a plurality of particles dispersed in a liquid suspending medium distributed within a matrix, said film characterized in that presence or lack thereof of an electric field results in the particles being aligned such that a beam of light may be reflected, transmitted or absorbed depending on the status of the electrical field applied thereto such a film; a switchable mirror device comprising a substrate and a mono layer film capable of undergoing a reversible change in light transmission or reflectance, said substrate including a film comprising a transmission metal composition; and a power supply device to provide an electrical charge to said film for use as a light modulating unit of spd and the substrate and the mono layer film, such that the application of the electric field provides for light absorbing or light reflecting functionality of a darkened characterization, and a mirror like state for the switching device.

11 Claims, 7 Drawing Sheets

U.S. PATENT DOCUMENTS

| | | |
|---|---|---|
| 6,762,871 B2 | 7/2004 | Yoshimura |
| 6,900,923 B2 | 5/2005 | Chakrapani et al. |
| 6,936,193 B2 | 8/2005 | Saxe et al. |
| 2005/0057701 A1* | 3/2005 | Weiss .......................... 349/10 |

FOREIGN PATENT DOCUMENTS

| | | |
|---|---|---|
| WO | 2005/102688 | 11/2005 |

* cited by examiner

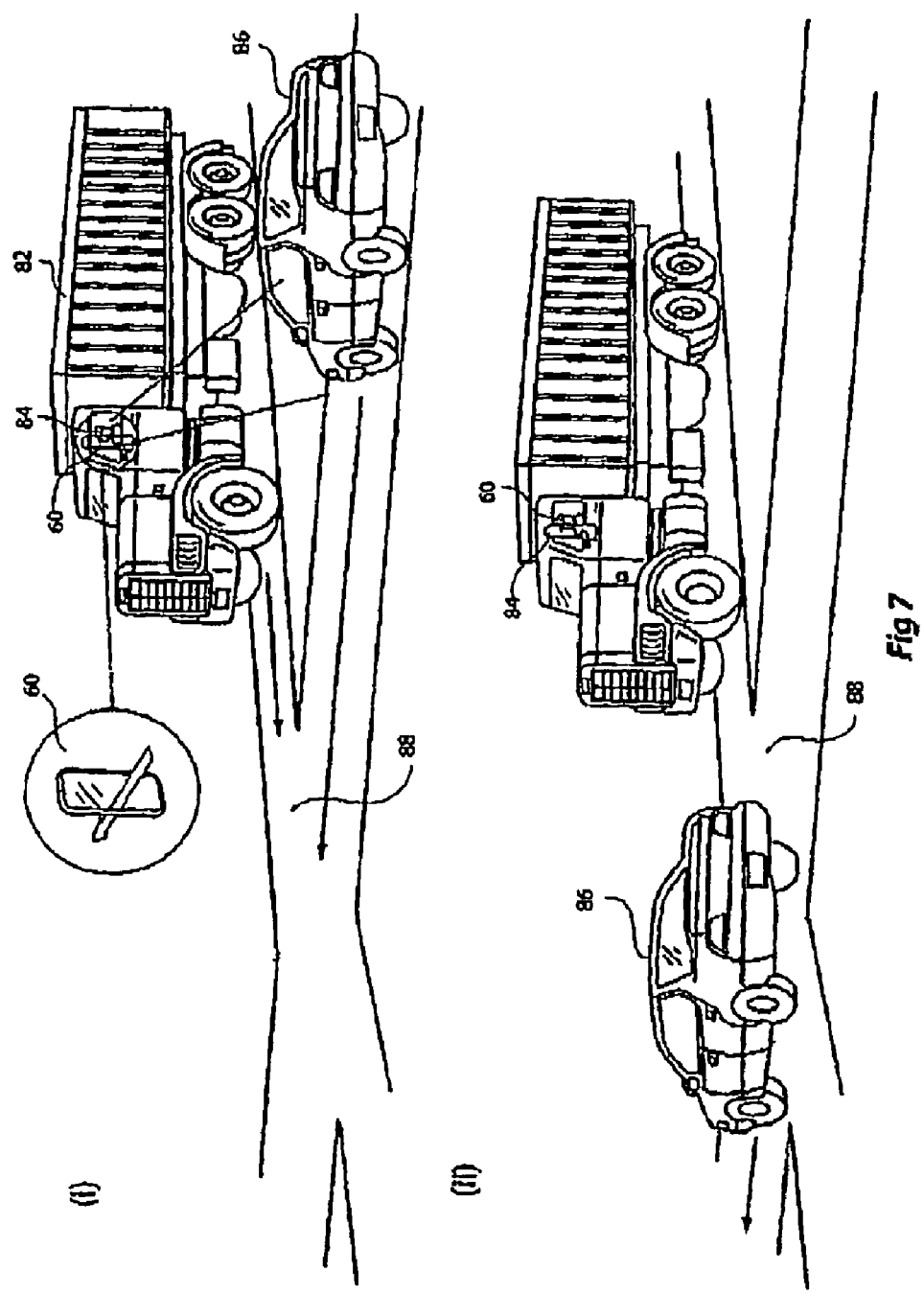

TRANSPARENT WINDOW SWITCHABLE REAR VISION MIRROR

TECHNICAL FIELD

This invention relates to an improved rear vision mirror which is switchable from a state of a functionality of a mirror to that of a transparent window.

Rear vision mirrors are used in motor vehicles to improve road safety. This invention is particularly concerned with the rear vision mirrors that are used on the outside or at least to the side of the driver responsible for placing the vehicle in motion.

BACKGROUND ART

The function of these kinds of rear vision mirrors are obvious in that they assist advising the driver the condition or situation of the happenings that are taking place at the back of the driver.

Nonetheless, in order to be placed in the optimum position to reflect the happenings that are taking place towards the rear and the side of the back section of the motor vehicle, such mirrors are often placed in locations that block out partial side view and some forward view of the driver.

Hence, though the rear vision mirror provides information as to the happenings of the rear of the vehicle, at certain moments in time if required, they do potentially restrict vision in certain side and forward viewings from the driver.

This restricted side vision is the result of the fact that the rear vision mirror, is just that, a mirror rather than a window to which one could look through.

The problem is particularly apparent in trucks and large pick up motor vehicles, where the rear vision mirror tends to be a long rectangular type construction extending or secured in a proximity not far from the front windscreen towards the side of the driver.

The problem becomes exaggerated when a truck is approaching an intersection and the driver needs to see whether or not vehicles coming from the side are approaching the intersection.

As experiences have shown, regrettably often the drivers vision is lost from this side viewing and therefore though there is a vehicle approaching the intersection from the right or left, they are lost behind that viewing section covered up by the rear vision mirror, with the driver only becoming aware of the presence of the vehicle, once the truck has entered the intersection, which regrettably is often too late with tragic circumstances occurring in a collision.

As the person skilled in the art would appreciate, the placing of the rear vision mirror on the right hand side and the driver being on the right hand side, is applicable to those countries that apply such a system of driving, the same problem would exist whether it is a left or right hand drive, and accordingly the rear vision mirror would be placed in that situation as well.

The purpose and the focus of this invention and the associated problem is to do with rear and side vision mirrors that are placed in vehicles, but then restrict vision of the driver within the vehicle.

Devices capable of switching between mirror like and transparent states have been known for many years. Such devices are commonly referred to in trade as "switchable mirrors" of which characterized by rare earth hydrids that were discovered and described by Huibertz et al, Nature L380,231 (1996), wherein the publication details are provided of a reversible metal to insulate a transition when a thin film (150 to 500 nm) of yttrium or lanthanum coated with a thin layer of palladium are exposed with hydrogen gas.

There is a transition whereby a metallic type hydride phase is converted to a semi conducting trihydride. This pioneering work led to the development of what was known as electro chromism whereby reversible change of colour exhibited by some materials when placed in an electric held could assist. In preparing switchable mirrors.

Certain kinds of material advantageously characterized by having a mirror like state when no electric field is present, are able to transfer to a transparent state when electric field is applied and vice versa using this kind of technology.

Thus, by placing films of electro chromatic material, such as those referred to by Huibertz and others since then, between electrodes, therein constructed will be an electro chromatic device, of which a person skilled in the art now commonly refers to as a "switching mirror" or "switching device".

Nonetheless, there are problems with these switchable mirrors that have been developed using this electro chromism technology as well as those more recently developed switchable mirrors which are created by laminating glass particulate and applying a hydrogen source to the film which by placing the hydrogen to the particulate material is capable then of switching between a darkened colour and a transparent state.

This technology that hitherto has gone before for providing switchable mirrors based on these electro chromatic materials do have problems in their reversible conversion between the mirror and transparent state when exposed to outdoor environments.

Light exposure provided either by solar, street lights or the like in the outdoor environment, reflect on to the device limiting the effects of the darkened colour, such that light transmittance tends to pass through the device as well as reflecting back.

Accordingly, such switchable mirrors prepared using current electro chromatic materials though potentially highly reflective in an indoor environment, loose their highly reflective light capabilities as the mirror in an outdoor environment because of exposure in a lighted outdoor environment.

Attempts to overcome this reflective problem by altering the rare earth compounds or quantities of the electro chromatic materials have not proved advantageous, because if the laminated film provides too much of a coloured or darkened state, the properties then of the material do not permit the switch back of the device to a clear state when required.

Therefore, in the prior art of switchable mirrors between a mirror like and transparent state, though there is technology available, such technology is not yet suitable for outdoor use, and therefore used as rear vision mirrors.

There have been those in the prior art that have looked at this problem of the reduction of the darkening effect of glass when exposed to reflective light in an outdoor environment, but such interest has been associated with windows rather than mirrors.

Research Frontiers Inc of the United States have provided a variety of windows characterized by including a suspended particle device (SPD) light valve film, to which such film is suitable for use as a light modulating unit within a window.

Nonetheless, these light valves have also been known for many years, and as referred to by Research Frontiers Inc, a light valve is used to describe a cell formed of two walls that are spaced apart by a small distance, with at least one wall being transparent. The walls have electrodes thereon, usually in the form of transparent electrically conductive coatings. The cell contains a light modulating element, referred to as the activatable material, which may be either a liquid suspension of particles or a plastic film in which droplets of liquid suspension of particles are distributed.

The liquid suspension also known as liquid light valve suspension, or a light valve suspension comprises small particles suspended in a liquid suspending medium.

In the absence of an applied electrical field, the particles in the liquid suspension assume random positions due to what is known as "Brownian" movement. Therefore a beam of light passing into the cell is reflected, transmitted or absorbed, depending upon the cell structure, the nature of the concentration of the particles and the energy content of the light.

Thus as the person skilled in the art would appreciate the light valve is thus relatively dark in the off state, but when an electric field is applied through the liquid light valve suspension in the light valve, the particles become aligned and for many suspensions most of the light can pass through the cell, hence providing a transparent clear window.

Research Frontiers Inc in U.S. Pat. No. 6,936,193 go on to describe and claim for a film suitable for use as a light modulating unit of suspended particle device (SPD) light valve.

It is the intention of this invention to utilize such a feature, but nonetheless the feature itself of simply being able to tint a glass window between the darkened state where light is absorbed or reflected back to a state where light is permitted to pass through, does still not solve the problem to which this invention is directed to, that being a rear vision mirror which is switchable between two states, that being mirror like and a transparent state in an outdoor environment.

It is therefore an object of this invention to provide a switchable mirror that is adapted to be used as a rear vision mirror in a motor vehicle to improve road safety.

Further objects and advantages of the invention will become apparent from a complete reading of this description described herein.

SUMMARY OF THE INVENTION

Accordingly, there is provided a transparent window switchable rear vision mirror adapted to be secured to a motor vehicle for improved road safety, said switchable window/mirror including:
- a film suitable for use as a light modulating unit of suspended particle device (spd) light valve, said film comprising a matrix polymer material having droplets of a liquid light valve suspension comprising a plurality of particles dispersed in a liquid suspending medium distributed within a matrix, said film characterized in that presence or lack thereof of an electric field results in the particles being aligned such that a beam of light may be reflected, transmitted or absorbed depending on the status of the electrical field applied thereto such a film;
- a switchable mirror device comprising a substrate and a mono layer film capable of undergoing a reversible change in light transmission or reflectance, said substrate including a film comprising a transmission metal composition;
- a power supply device to provide an electrical charge to said film for use as a light modulating unit of SPD and the substrate and the mono layer film, such that the application of the electric field provides for light absorbing or light reflecting functionality of a darkened characterization, and a mirror like state for the switching device.

An advantage of such an arrangement is that this invention utilizes two independent technologies, first of all the conventional spd light valves, as well as the conventional switching devices between the mirror state and transparent state of such substrates.

As explained above previously devices capable of switching between mirror like and transparent states were not suitable for outdoor use, because in the darkened state to provide the reflection of the light back to act as the mirror, exposure to the outdoor environment were such, that the darkening was not enough to reflect or absorb all light back, and therefore such mirrors in an outdoor environment were providing two images, that being part mirror like images at the back but also images at the front of the device, because under the influence of the outside environment the switching device was also partially in the transparent state.

Advantageously however, with this invention the electrical field provides activation of not only the switchable device but also the spd light valves, and once the spd light valves are darkened there is no longer the problem of the exposure of the outdoor light and the like influencing the device.

Advantageously, if such transparent window switchable rear vision mirrors are placed in motor vehicles, particularly trucks, when a driver approaches the intersection or a place where total side vision is required, by virtue of the electrical field generated or the absence thereof, depending on the charged circumstances of the device, this action can send the required charge or remove such a charge so that the spd light valve can be cleared to provide a transparent state and so to the switchable mirror can then be switched to the transparent state, whereby both portions then offer unimpeded vision therethrough.

Advantageously, the switching between the mirror state to the transparent state means that the driver can now see through the mirror and the vision is no longer obstructed from the rear vision mirror, and hence in times when a motor vehicle, particularly a truck is approaching the intersection, vehicles approaching from the side can be observed before the truck enters the intersection, thereby substantially limiting the possibility of a collision.

In preference, the switchable mirror also includes a covering glass.

Advantageously, the mirror is then divided up into three sections one being the conventional spd light valve unit, then the switchable device comprising the substrate and the mono layer capable of undergoing reversible change in light transmittance or reflectance, and then finally protective film of glass to improve the sturdiness and the usable life cycle of the product.

BEST MODE FOR CARRYING OUT THE INVENTION

In order to describe the invention in greater detail there is provided a preferred embodiment wherein:

FIGS. 1(*i*)&(*ii*) illustrates a perspective schematic views of prior art rear vision mirrors applied to trucks, and the consequence they have on road safety;

FIG. 2 shows a perspective schematic view of a typical example of a side and rear vision mirror to which are attached to trucks and large pick ups;

FIGS. 3*a* and 3*b* refers to the characteristics of the conventionally available spd light valve technology;

FIGS. 4*a*, 4*b* & 4*c* shows a perspective schematic view of the functionality of switchable mirrors that are made up of a substrate and a mono layer film capable of undergoing a reversible change in light transmission or reflectance when used in an outdoor environment;

FIGS. 7(i) and 7(ii) shows an application of the transparent window switchable rear vision mirror of the invention of its application to a truck and its improvement of road safety.

Figure 1:
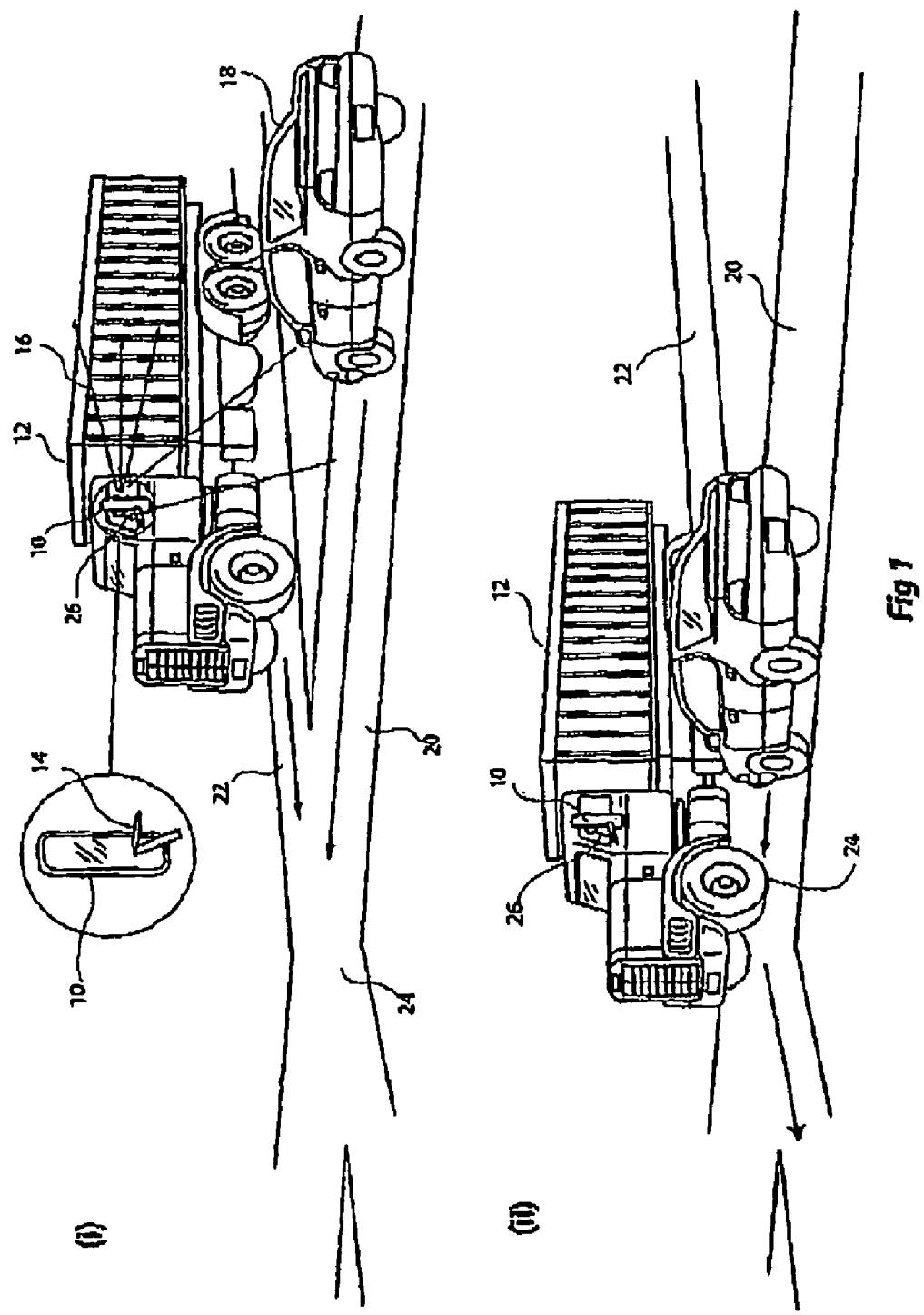
Figure 2:
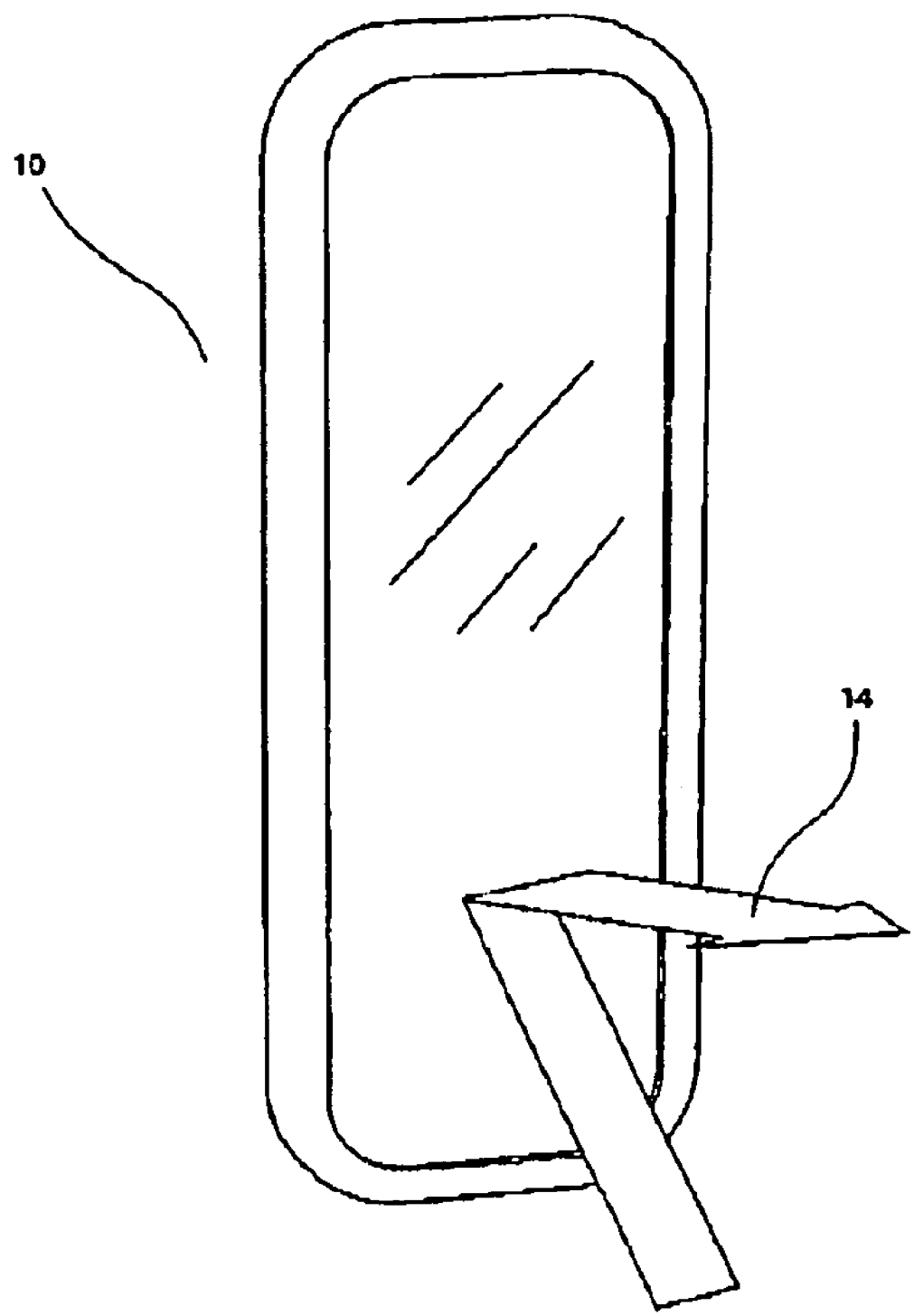

Referring to the drawings now in greater detail starting with FIG. 1.

Conventional rear vision mirror 10 is fastened to a truck 12. As shown by way of the arrow 14 in the exploded representation within the circled dotted line of the rear vision mirror 10, the driver would utilize the rear vision mirror to assist in identifying happenings occurring towards the rear of the vehicle as shown by arrow 16.

Nonetheless, the rear vision mirror 10 acts obstructively to side vision, hiding from sight certain happenings at certain side distances from the truck 12.

As shown in FIGS. 1(i) and 1(ii) a motor vehicle 18 traveling along road 20 approaching intersection 24 which aligns with road 22, is hidden from sight from the driver 26.

Therefore, as is expected as this truck 12 makes it way towards intersection 24, it the motor vehicle 18 is hidden from view the driver 26 will feel comfortable that they can continue to make their way through the intersection 24, until they realize that once they are well into the intersection 24, vehicle 18 appears, of which at this time is too late to potentially avoid a tragic collision.

Figure 3:
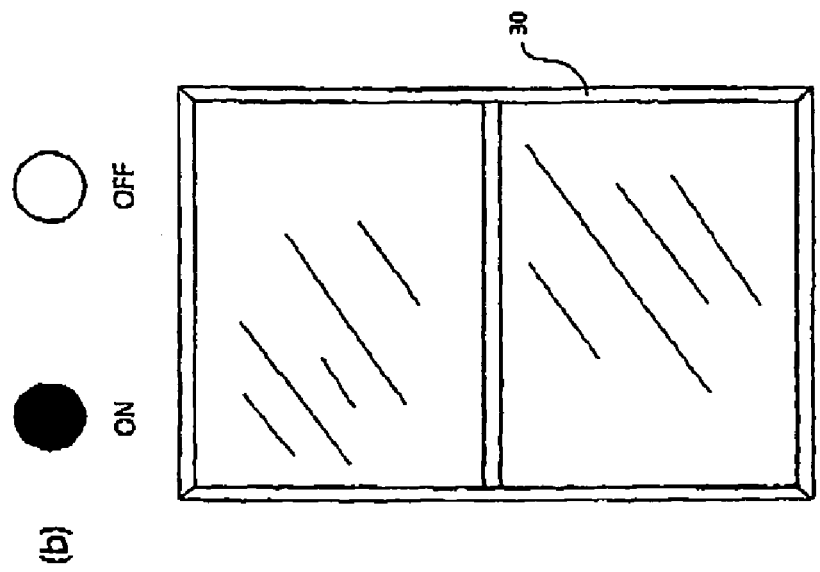
Figure 3:
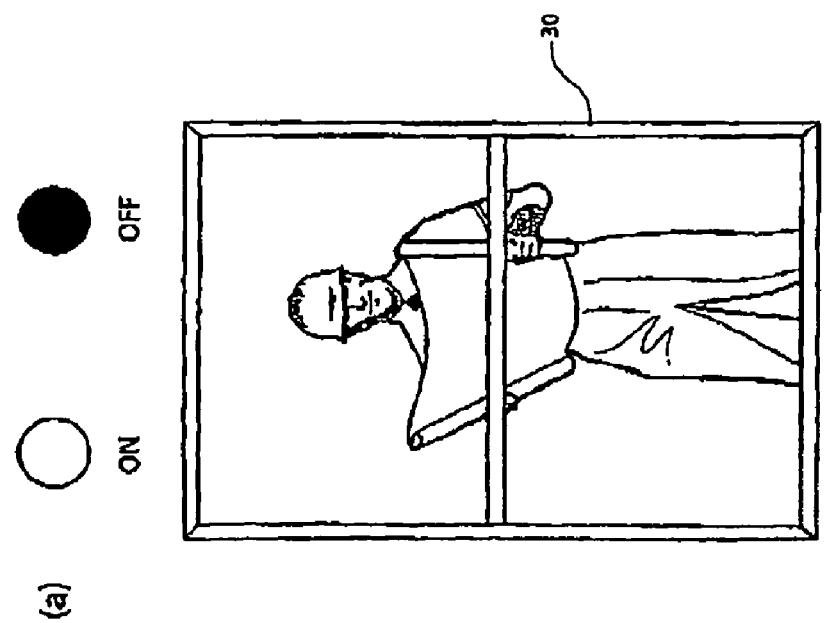

FIGS. 3a and 3b shows representation which helps assist in understanding the technology connected with part of the invention which utilizes a film for use as a light modulating unit of spd light valve.

This technology applies an electric field to the window 30 which as introduced above alters the structure of the material making up the film, which in the case of 3b provides for a completely darkened light valve whereby no light is able to pass through and also when the electric field is withdrawn the situation in FIG. 3a where there is a clear transparent window 30 provided for.

As the person skilled in the art will appreciate, such light valves can operate differently depending on the presence or lack thereof of an electric field. In some cases the application of the electric field will provide for a transparent state, while in other cases the absence thereof of the electric field provides the transparent case.

What is critical to the invention is that altering the electrical characteristics applied to window 30, will provide for either a darkening or a transparent state of the material in relation to light transmission.

FIGS. 4a, 4b & 4c shows a schematic series of illustrations that assist in understanding the technology associated with currently available switching devices that comprise of a substrate and a mono layer film capable of undergoing reversible change in light transmittance or reflectance.

FIG. 4a shows the switching device in light transmittance mode, whereby essentially the device is acting as a window. FIG. 4b shows that when the electrical characteristics being applied to the device are altered, it can be switched to act as a mirror and therefore exhibit light reflectance characteristics.

Nonetheless, as shown in FIG. 4c when such a switching device is used in an outdoor environment, the exposure of the general light on the environment weakens the darkening effect which characterizes the mirror formation in FIG. 4b; such that the device though providing light reflectance also has light transmittance.

Figure 4:
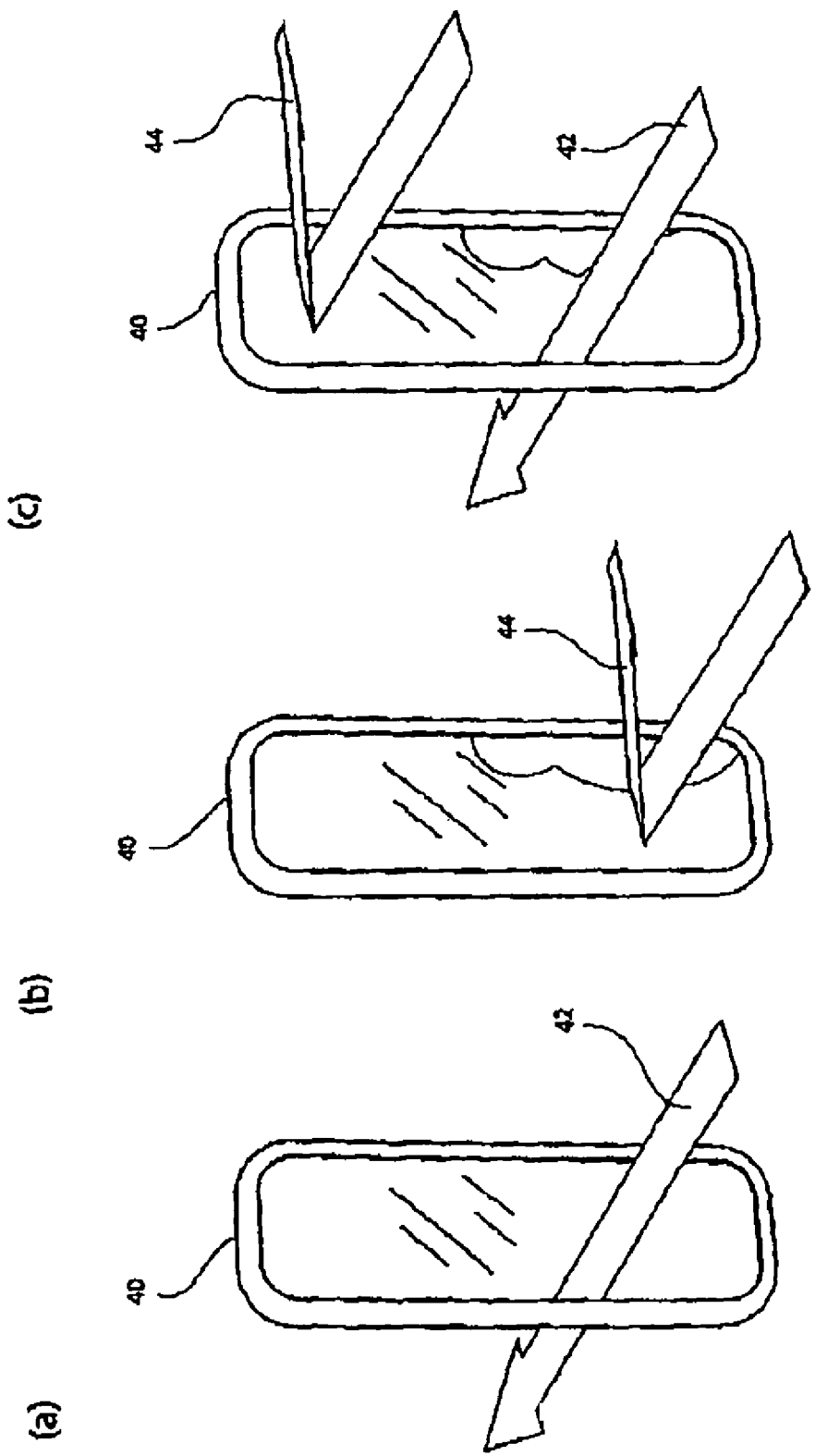

In FIG. 4 the switching device 40 shows light transmittance at 42 light reflectance at 44 and a combination thereof as detailed in FIG. 4c.

Figure 5:
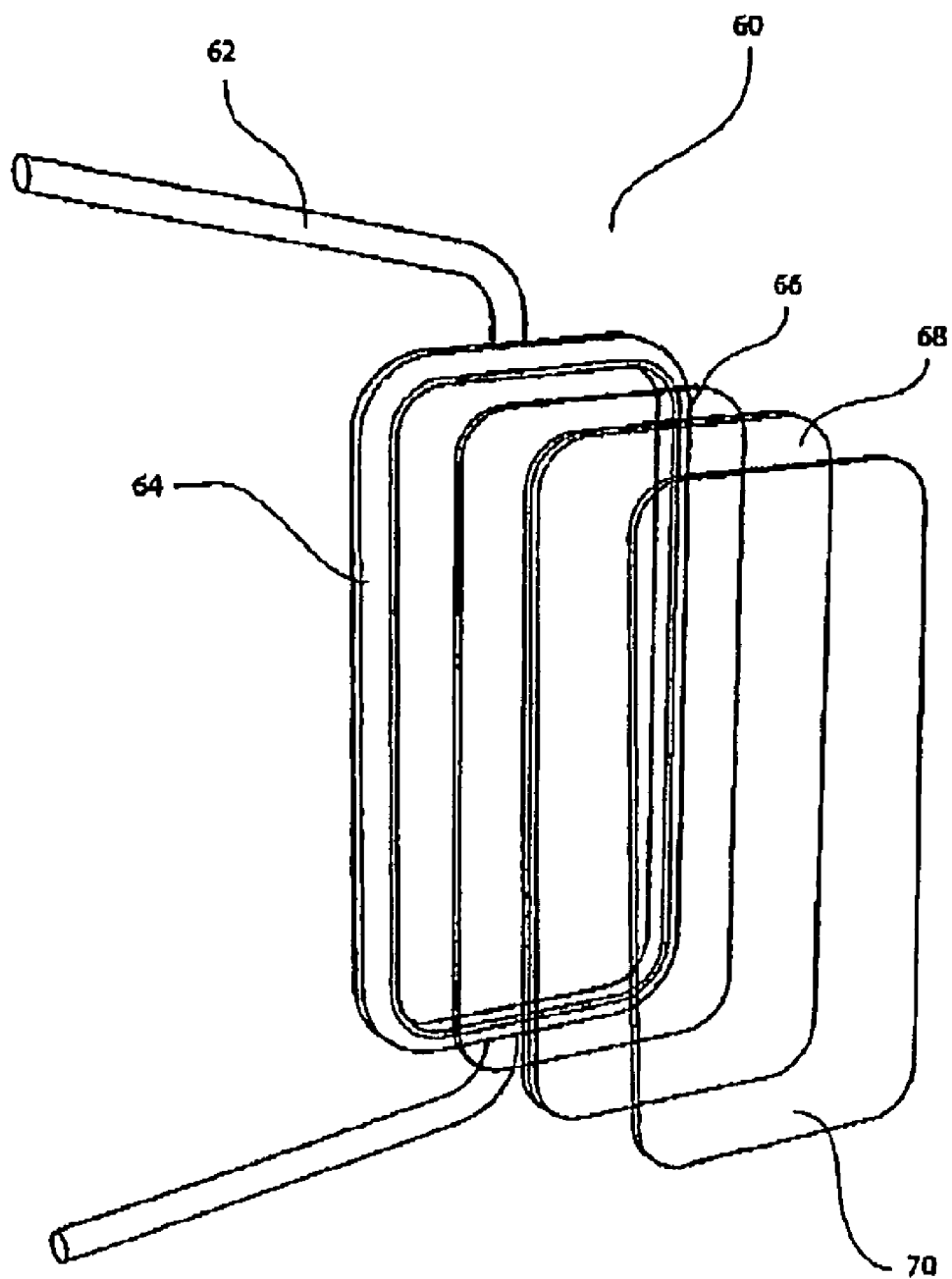
FIG. 5 shows a perspective view of a preferred embodiment of the transparent window switchable rear vision mirror of this invention.
Figure 6:
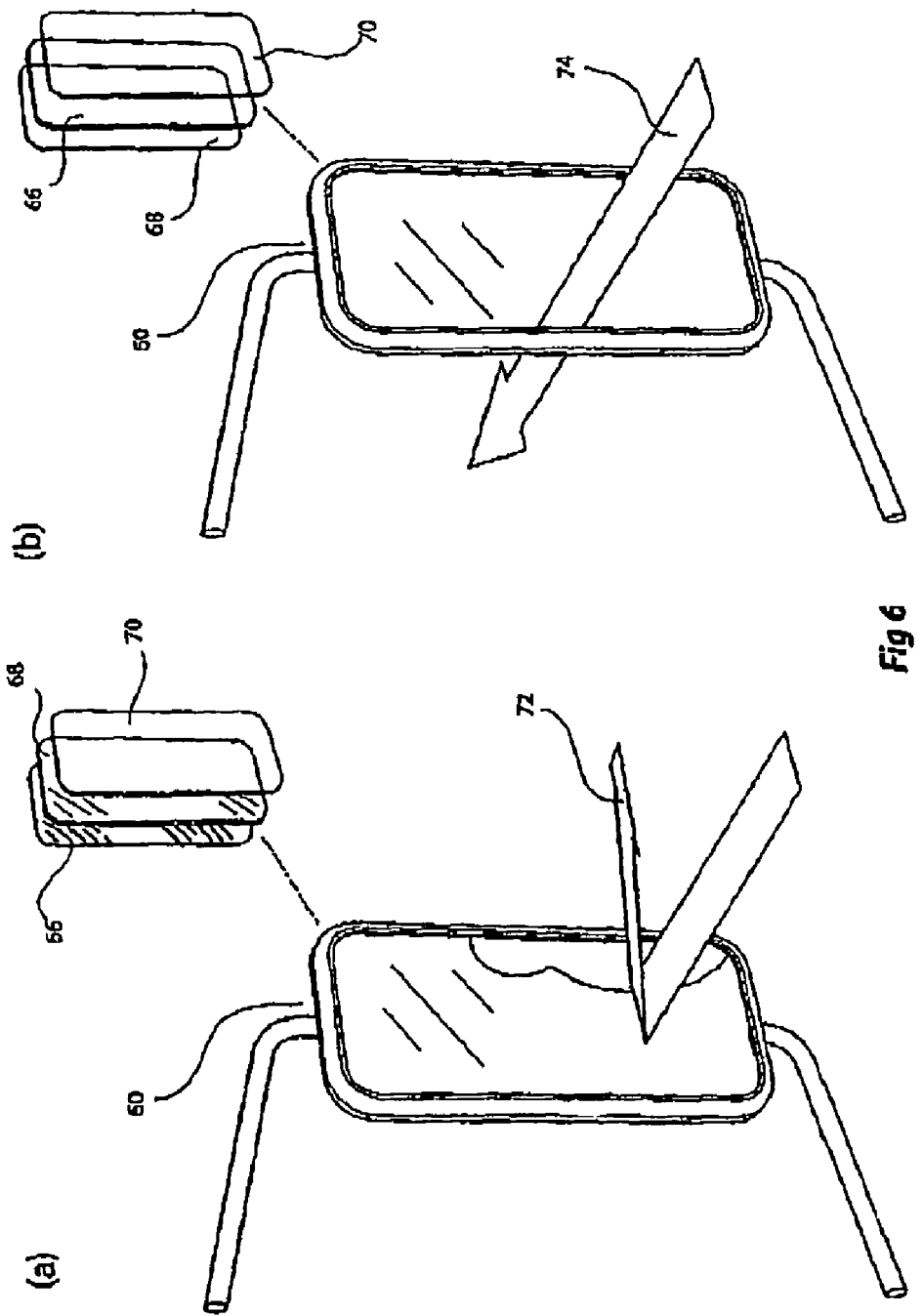
FIGS. 6a and 6b shows a perspective and functional view as to how the transparent window switchable rear vision mirror is utilized for this invention.

FIGS. 5 and 6a,6b show schematic and perspective views of how the transparent window switchable rear vision mirror of this invention is functionally and structurally presented in one preferred embodiment.

However this is only a preferred embodiment. Some embodiments would have just a single piece or unit of glass or the like, of which would include as part of its arrangement the three portions or segments to be introduced as 66,68 and 70.

Switchable window mirror 60 includes a bracket 62 that includes a frame 64 to which a functional feature of the invention can be housed therein. The spd light valve feature 66 is placed back to back with the switching device comprising the substrate and the mono layer film capable of undergoing reversible change 68 of which is secured and protected by a covering segment of glass 70.

As illustrated in FIG. 6a, the device 60 can act as a mirror whereby the appropriate electrical field is removed or applied to both the spd light valve and the substrate and mono layer film for reversible change, such that the spd valve provides a darkening effect 66, and the switching device is in the state to which it allows light reflectance as a mirror.

Advantageously, the combination of the spd valve back to back with the conventional switchable mirror, means that the darkened characterization of 66, removes away the effect of light exposure of which is prevalent in an outdoor environment.

The transparent window switchable rear vision mirror 60 in 6a remains in the state of that being a mirror and therefore will reflect light 72 rather than the situation shown in FIG. 6b, where the electrical field or lack thereof applied to 66, 68 is such that both portions provide clear transparent vision there through thereby allowing light transmission 74 to pass through the device 60 of this invention.

FIGS. 7(i) and 7(ii) shows the application of the transparent window switchable rear vision mirror 60 of this invention, being applied to truck 82.

Nonetheless, the application of device 60 to truck 82 as opposed to the scenario presented in FIGS. 1(i) and (ii), results in improved road safety, because as the driver 84 approaches the intersection 88, by applying the appropriate electric field to the mirror, provides for a clear vision as shown in FIG. 6b, allowing the driver 84 to be aware of the presence of the approaching motor vehicle 86, which is entering into section 88, to which truck 82 is also heading to.

Advantageously, as the driver 84 has been able to sight the motor vehicle 86 before entering the intersection 88, the driver 84 is able to stop the truck 82 and not enter the intersection 88, allowing motor vehicle 86 to pass there through the intersection and subsequently avoid a collision of which was a real possibility presented in the scenario illustrated in FIG. 1.

As the person skilled in the art will appreciate there are a variety of ways in which this invention could be applied, but what remains central to the invention is the combination of using existing technology, and applying it to a rear vision mirror of which would normally not be considered for use with such technology, to provide a safety device for road transport.

The purpose of the preferred embodiment described above simply is to illustrate an application of a specific structural presentation, and therefore should not be considered limiting in any way.

The invention claimed is:

1. A transparent window switchable rear vision mirror adapted to be secured to a motor vehicle said switchable window/mirror including:
   a film being a light modulating unit of suspended particle device light valve, said film comprising a matrix polymer material having droplets of a liquid light valve suspension comprising a plurality of particles dispersed in a liquid suspending medium distributed within a matrix, said film characterized in that presence of lack thereof of an electric field results in the particles being aligned such that a beam of light may be reflected, transmitted or absorbed via said film;
   a switchable mirror device comprising a substrate and a mono layer film capable of undergoing a reversible change in light transmission or reflectance, said substrate including a film comprising a transmission metal composition;
   a power supply device to provide an electrical charge to said film for use as a light modulating unit of the suspended particle device and the substrate and the mono layer film, such that the application of the electric field provides for light absorbing or light reflecting functionality of a darkened characterization, and a mirror state which reflects light;
   wherein the application of an electrical charge to the transparent window switchable rear vision mirror activates both said film of the light modulating the suspended particle device light valve unit and said switchable mirror device, wherein activation of said film can reflect, transmit or absorb a beam of light and said switchable mirror device can transmit or reflect light, such that the transparent window switchable rear vision mirror can assume a transparent state or a said mirror state.

2. The transparent window switchable rear vision mirror of claim 1 wherein the window switchable rear vision mirror is provided as a single unit divided into at least three sections.

3. The transparent window switchable rear vision mirror of claim 2 wherein one section is characterized as being the suspended particle device light valve unit.

4. The transparent window switchable rear vision mirror of claim 3 wherein one section is characterized as being the substrate and the mono layer capable of undergoing reversible change in light transmittance or reflectance.

5. The transparent window switchable rear vision mirror of claim 4 wherein one section is a protective film of glass.

6. The transparent window switchable rear vision mirror of claim 5 further including a covering plate.

7. The transparent window switchable rear vision mirror of claim 1 further including a covering plate.

8. The transparent window switchable rear vision mirror of claim 2 further including a covering plate.

9. The transparent window switchable rear vision mirror of claim 3 further including a covering plate.

10. The transparent window switchable rear vision mirror of claim 4 further including a covering plate.

11. A transparent window switchable rear vision mirror adapted to be secured to a motor vehicle wherein said transparent window switchable rear vision mirror comprises:
   a film being a light modulating unit of suspended particle device light valves, said film comprising a matrix polymer material having droplets of a liquid light valve suspension comprising a plurality of particles dispersed in a liquid suspending medium distributed within a matrix wherein in response to an electric field the particles align such that a beam of light may be reflected, transmitted or absorbed by said film;
   a switchable mirror device comprising a substrate and a mono layer film capable of undergoing a reversible change in light transmission or reflectance, said substrate including a film comprising a transmission metal composition;
   a power supply device capable of providing an electrical field to said film for use as a light modulating unit of said suspended particle device, the substrate and the mono layer film such that the application of the electric field provides for light absorbing or light reflecting functionality of a darkened characterization, and a mirror state for the switchable device;
   wherein an electrical field applied to the transparent window switchable rear vision mirror can activate said film of the light modulating unit, the suspended particle device light valves and said switchable mirror device, wherein the suspended particle device light valves are darkened such that the transparent window switchable rear vision mirror assumes a mirror state and reflects light;
   wherein in the absence of said electrical field to the transparent window switchable rear vision mirror can deactivate said film of the light modulating unit, the suspended particle device light valves and said switchable mirror device, wherein the suspended particle device light valves are cleared such that the transparent window switchable rear vision mirror assumes a transparent state.

* * * * *